US008848724B2

(12) United States Patent
Voruganti et al.

(10) Patent No.: US 8,848,724 B2
(45) Date of Patent: Sep. 30, 2014

(54) SYSTEM AND METHOD FOR DYNAMICALLY ALLOCATING BUFFERS BASED ON PRIORITY LEVELS

(75) Inventors: Sreenivas Voruganti, Bangalore (IN); Atul Mahamuni, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/447,660

(22) Filed: Apr. 16, 2012

(65) Prior Publication Data

US 2012/0275464 A1 Nov. 1, 2012

Related U.S. Application Data

(63) Continuation of application No. 11/963,293, filed on Dec. 21, 2007, now Pat. No. 8,160,085.

(51) Int. Cl.
*H04L 12/28* (2006.01)
*H04L 12/861* (2013.01)

(52) U.S. Cl.
CPC ............ *H04L 49/9078* (2013.01); *H04L 49/90* (2013.01)
USPC .......................................... 370/412; 370/229

(58) Field of Classification Search
USPC .................................. 370/229, 412
See application file for complete search history.

(56) References Cited

U.S. PATENT DOCUMENTS

| | | | | |
|---|---|---|---|---|
| 6,018,527 | A * | 1/2000 | Yin et al. | 370/395.41 |
| 6,067,301 | A * | 5/2000 | Aatresh | 370/418 |
| 6,104,700 | A * | 8/2000 | Haddock et al. | 370/235 |
| 6,134,596 | A * | 10/2000 | Bolosky et al. | 709/233 |
| 6,212,196 | B1 | 4/2001 | Momona | |
| 6,633,835 | B1 | 10/2003 | Moran et al. | |
| 6,822,940 | B1 * | 11/2004 | Zavalkovsky et al. | 370/237 |
| 7,219,249 | B1 | 5/2007 | Ghose et al. | |
| 8,160,085 | B2 | 4/2012 | Voruganti et al. | |
| 2007/0104102 | A1 | 5/2007 | Opsasnick | |

OTHER PUBLICATIONS

Office Action mailed Sep. 18, 2009, for U.S. Appl. No. 11/963,293.
Office Action mailed May 13, 2010, for U.S. Appl. No. 11/963,293.
Final Office Action mailed Nov. 1, 2010, for U.S. Appl. No. 11/963,293.
Office Action mailed Apr. 18, 2011, for U.S. Appl. No. 11/963,293.

* cited by examiner

*Primary Examiner* — Chirag Shah
*Assistant Examiner* — Jenkey Van (57) ABSTRACT

Methods and systems consistent with the present invention provide dynamic buffer allocation to a plurality of queues of differing priority levels. Each queue is allocated fixed minimum number of buffers that will not be de-allocated during buffer reassignment. The rest of the buffers are intelligently and dynamically assigned to each queue depending on their current need. The system then monitors and learns the incoming traffic pattern and resulting drops in each queue due to traffic bursts. Based on this information, the system readjusts allocation of buffers to each traffic class. If a higher priority queue does not need the buffers, it gradually relinquishes them. These buffers are then assigned to other queues based on the input traffic pattern and resultant drops. These buffers are aggressively reclaimed and reassigned to higher priority queues when needed.

10 Claims, 5 Drawing Sheets

SYSTEM AND METHOD FOR DYNAMICALLY ALLOCATING BUFFERS BASED ON PRIORITY LEVELS

CROSS-REFERENCE TO RELATED APPLICATION

This application is a continuation of U.S. application Ser. No. 11/963,293, entitled "SYSTEM AND METHOD FOR DYNAMICALLY ALLOCATING BUFFERS BASED ON PRIORITY LEVELS," filed Dec. 21, 2007, which is incorporated by reference herewith in its entirety.

FIELD OF THE INVENTION

The present invention generally relates to buffer management in a router, and relates more particularly to dynamic allocation and de-allocation of buffers based on acceptable drop rates for differing priority classes of traffic.

BACKGROUND

Network packet routers use buffer management techniques to share limited buffer space between various incoming data ports and classes of data packets. Typically, the packets are divided into cells that are managed by a set of queues. Packets from multiple ports are en-queued to multiple queues based on their classified priority and de-queued based on available bandwidth of the shared output port(s). Often the available output bandwidth is less than the aggregate input bandwidth and packets must be dropped because there is limited shared buffer memory. Packets are dropped by either not en-queuing them at the tail of the queue for processing, or by de-queuing from the head of the queue and simply not processing them. If there is efficient buffer management of the shared buffer memory, overall loss performance can be improved, i.e., the packet drop rate can be minimized. However, there are many restrictions on implementing a buffer management scheme. The hardware implementing the management should operate at the rate of the incoming packets, and this rate approaches the maximum rate that can be realized using current memory technology.

Routers use buffer allocation techniques to share limited buffer space between various incoming data ports and classes of data packets. Packets from multiple ports are en-queued to multiple queues based on their classified priority and de-queued based on available bandwidth of the shared output port(s). To ensure that higher priority traffic receives a guaranteed share of the buffer space, network administrators typically employ a statically configured buffer allocation. However, this kind of fixed allocation typically requires over allocation in favor of higher priority traffic classes. The fixed allocation scheme is sub-optimal because these over-allocated buffers cannot be used for other lower priority traffic even when they are underutilized by the higher priority traffic classes for which the buffers were statically allocated.

SUMMARY

Systems and methods consistent with the present invention provide a buffer management scheme that dynamically optimizes the buffer allocation for each traffic class queue based on an assigned acceptable drop percentage for each queue. Unlike conventional buffer management schemes, buffers assigned to high priority queues may be de-allocated when they are underutilized, and reassigned to lower priority queues that need them. When the high priority queue needs them again, such as during a traffic burst, the buffers are aggressively reclaimed by the high priority queue. This dynamic buffer allocation scheme ensures a better utilization of buffers than conventional static schemes, while still giving high priority queues preference in buffer allocation.

One embodiment consistent with systems and methods in accordance with the present invention is directed to a method in a computing device for dynamic buffer allocation among a plurality of queues corresponding to different priority classes of traffic. The method includes the steps of determining a drop count for one of the plurality of queues, comparing the drop count to a predetermined drop count threshold for that queue, de-allocating buffers from the queue when the drop count is below the predetermined threshold for that queue, and allocating buffers to the queue when the drop count is above the predetermined threshold for that queue. Allocating buffers to the queue may include determining a needed allocation based on a current allocation plus the drop count, and allocating the lesser of the needed allocation and a maximum allowable allocation for that queue. De-allocating buffers may include preserving a predetermined minimum allocation for that queue. De-allocating buffers may further include de-allocating buffers in stages. De-allocating buffers in stages may include de-allocating all of the buffers not currently used by the queue. Gradually de-allocating buffers includes de-allocating no more than a predetermined threshold for an evaluation cycle. The method may further include determining the queue to be a high priority queue, wherein allocating buffers includes de-allocating buffers from queues in the plurality of queues having lesser priority than the high priority queue, and allocating the freed buffers to the high priority queue. Moreover de-allocating buffers from queues in the plurality of queues having lesser priority than the high priority queue is performed proportionally to occupancy of the queues in the plurality of queues having lesser priority. The method may be performed in a router.

Another embodiment consistent with systems and methods in accordance with the present invention is directed to a computer-readable medium storing computer executable instructions for performing a method of dynamic buffer allocation among a plurality of queues corresponding to different priority classes of traffic. The method includes the steps of determining a drop count for one of the plurality of queues, comparing the drop count to a predetermined drop count threshold for that queue, de-allocating buffers from the queue when the drop count is below the predetermined threshold for that queue, and allocating buffers to the queue when the drop count is above the predetermined threshold for that queue. Allocating buffers to the queue may include determining a needed allocation based on a current allocation plus the drop count, and allocating the lesser of the needed allocation and a maximum allowable allocation for that queue. De-allocating buffers may include preserving a predetermined minimum allocation for that queue. De-allocating buffers may further include de-allocating buffers in stages. De-allocating buffers in stages may include de-allocating all of the buffers not currently used by the queue. Gradually de-allocating buffers includes de-allocating no more than a predetermined threshold for an evaluation cycle. The method may further include determining the queue to be a high priority queue, wherein allocating buffers includes de-allocating buffers from queues in the plurality of queues having lesser priority than the high priority queue, and allocating the freed buffers to the high priority queue. Moreover de-allocating buffers from queues in the plurality of queues having lesser priority than the high priority queue is performed proportionally to occupancy of the queues in the plurality of queues having lesser priority. The method may be performed in a router.

Another embodiment consistent with systems and methods in accordance with the present invention is directed to a router comprising a memory storing a program for dynamic buffer allocation among a plurality of queues corresponding to different priority classes of traffic, the program including determining a drop count for one of the plurality of queues, determining the drop count to exceed a drop count threshold for that queue, determining the queue to be a high priority queue, determining how many buffers the high priority queue needs, de-allocating buffers from queues in the plurality of queues having lesser priority than the high priority queue, and allocating the freed buffers to the high priority queue; and a processor executing the program.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION

Methods and systems consistent with the present invention provide dynamic buffer allocation to a plurality of queues of differing priority levels. Each queue is allocated fixed minimum number of buffers that are not de-allocated from them in buffer reassignment. The rest of the buffers are intelligently and dynamically assigned to each queue depending on their current need. The system then monitors and learns the incoming traffic pattern and resulting number of packets each queue is dropping due to traffic bursts. Based on this information, the system readjusts allocation of buffers to each traffic class. If a higher priority queue does not need the buffers, it gradually relinquishes them. These buffers are then assigned to other queues based on the input traffic pattern and packet drops that result from an overflow of packets. These buffers are aggressively reclaimed and reassigned to higher priority queues when needed. In this way, methods and systems consistent with the present invention dynamically balance requirements of the higher priority queues versus the quasi-static optimal utilization of the limited number of available buffers.

Reference will now be made in detail to an implementation consistent with the present invention as illustrated in the accompanying drawings.

Figure 1:
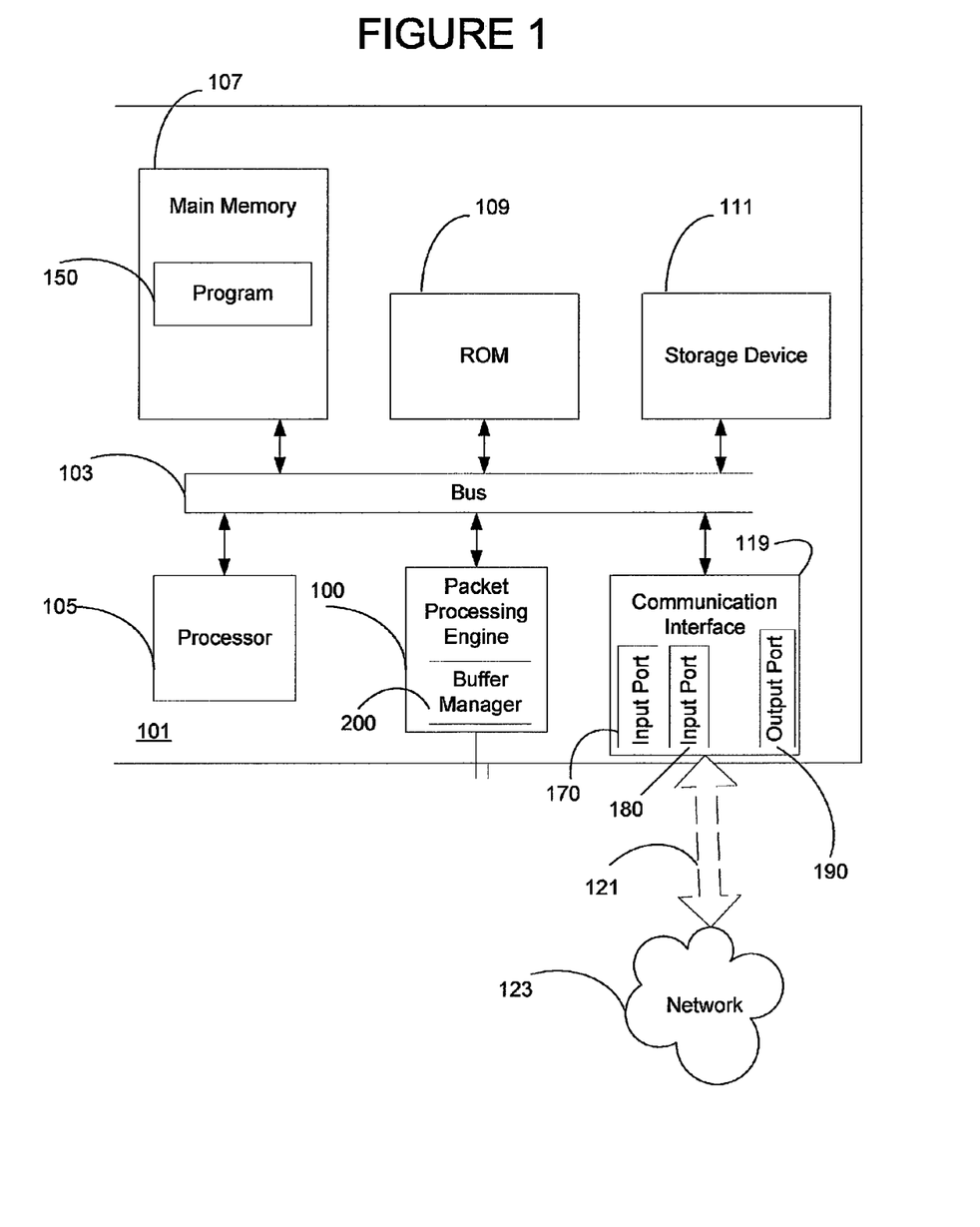
FIG. 1 illustrates an exemplary router in which methods and systems consistent with the present invention may be implemented.

FIG. 1 illustrates an exemplary router 101 consistent with systems and methods consistent with the present invention. Router 101 includes a bus 103 or other communication mechanism for communicating information, and a processor 105 coupled with bus 103 for processing the information. Router 101 also includes a main memory 107, such as a random access memory (RAM) or other dynamic storage device, coupled to bus 103 for storing information and instructions to be executed by processor 105. In addition, main memory 107 may be used for storing temporary variables or other intermediate information during execution of instructions to be executed by processor 105. Main memory 107 includes a program 150 for implementing packet drop arbitration consistent with methods and systems consistent with the present invention, described below. Router 101 further includes a read only memory (ROM) 109 or other static storage device coupled to bus 103 for storing static information and instructions for processor 105. A storage device 111, such as a magnetic disk or optical disk, is provided and coupled to bus 103 for storing information and instructions.

According to one embodiment, processor 105 executes one or more sequences of one or more instructions contained in main memory 107. Such instructions may be read into main memory 107 from another computer-readable medium, such as storage device 111. Execution of the sequences of instructions in main memory 107 causes processor 105 to perform the process steps described herein. One or more processors in a multi-processing arrangement may also be employed to execute the sequences of instructions contained in main memory 107. In alternative embodiments, hard-wired circuitry may be used in place of or in combination with software instructions. Thus, embodiments are not limited to any specific combination of hardware circuitry and software.

Although described relative to main memory 107 and storage device 111, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Router 101 also includes a communication interface 119 coupled to bus 103. Communication interface 119 provides a two-way data communication coupling to a network link 121 that is connected to a local network 123. The communication interface includes input ports 170 and 180, as well as an output port 190. One of ordinary skill in the art will recognize there may be numerous input and output ports. Wireless links may also be implemented. In any such implementation, communication interface 119 sends and receives signals that carry digital data streams representing various types of information.

Figure 2:
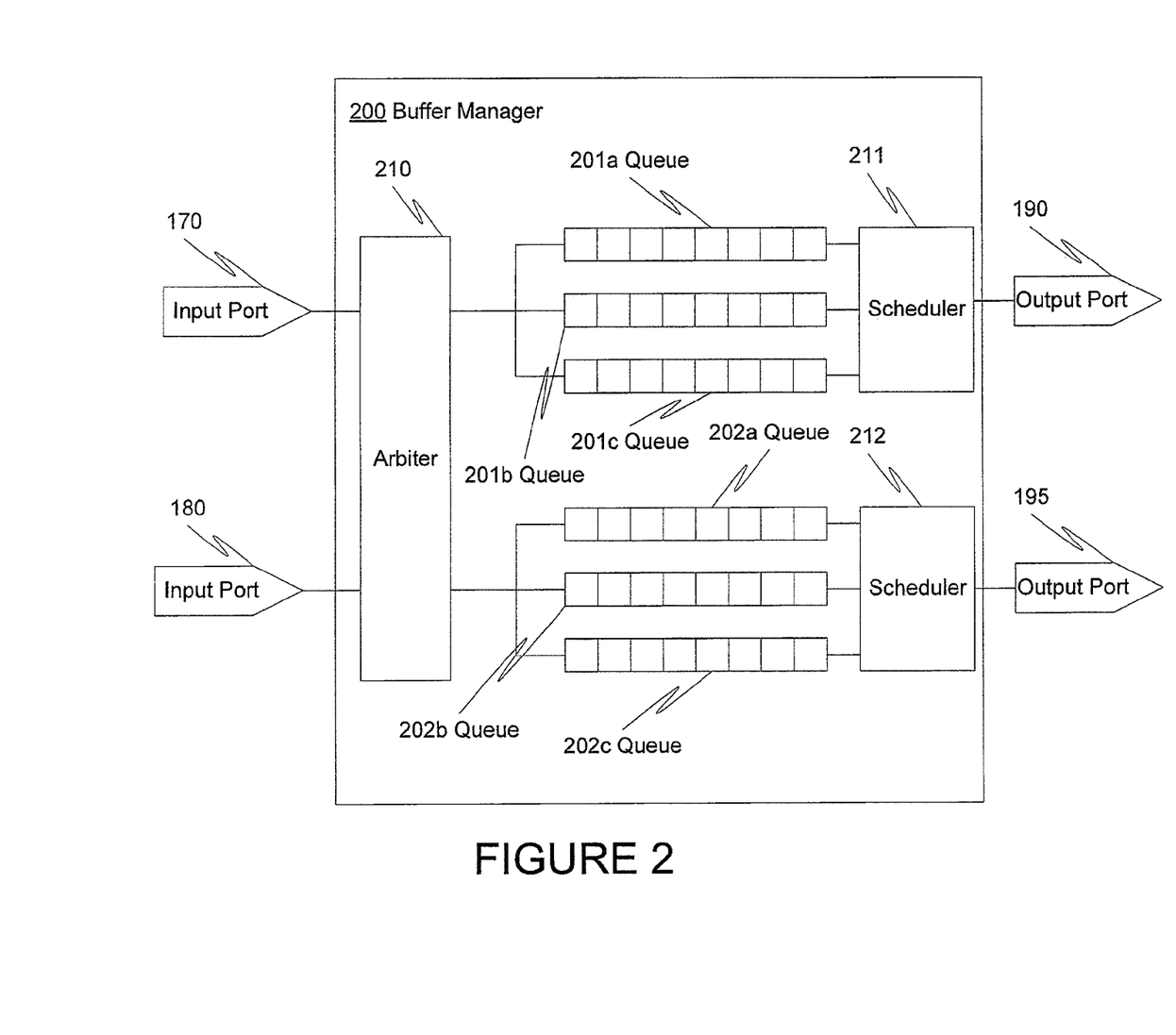
FIG. 2 illustrates a buffer manager consistent with methods and systems consistent with the present invention.

Router 101 further includes at least one packet processing engine (PPE) 100 to process packet headers and determine the next hop of the packet. In order to store and manage the packets during processing, PPE 100 includes a buffer manager 200. FIG. 2 illustrates a buffer manager 200 consistent with methods and systems consistent with the present invention. Buffer manager 200 comprises a plurality of queues corresponding to a set of output ports, with each port having a set of queues corresponding to a packet priority level. In an exemplary embodiment consistent with the present invention, buffer manager 200 includes queues 201a, 201b, and 201c allocated to output port 190 and having three priority levels respectively, and queues 202a, 202b, and 202c allocated to output port 195 and having three priority levels respectively. One of ordinary skill in the art will recognize that there may be any number of ports or priority levels. Queues 201a, 201b, 201c, 202a, 202b, and 202c are allocated from memory, for example, memory 107, in units of memory called "buffers." Because there is inherently a finite amount of memory, referred to for purposes herein as "buffer space," there is a need to optimize the amount of memory used by queues 201a, 201b, 201c, 202a, 202b, and 202c. During periods of high traffic within the router, it is possible to consume all of the available buffer space.

Packets received from any of the input ports, are en-queued to the queues of the output port for which they are destined via arbiter 210. Arbiter 210 determines if the packet can be enqueued to one of the queues 201a, 201b, 201c destined for output port 190 depending upon the priority of the incoming packet. Alternatively, when the buffer space cannot sustain additional packets, arbiter 210 determines from which queue of queues 201a, 201b, 201c, 202a, 202b, and 202c to drop a packet. In dropping the packet, the router 101 will not process or forward the packet, thus freeing buffer space within the router. The router 101 maintains a drop count, or the number of packets dropped in a time interval, for each of the queues. Schedulers 211 and 212 de-queue packets from queues 201a, 201b, 201c, 202a, 202b, and 202c, respectively. The schedulers 211 and 212 attempts to ensure that they are sending an appropriate amount of traffic the output ports 190 and 195 to avoid packet dropping. Schedulers 211 and 212 manage access to a fixed amount of output port 190, 195 bandwidth by selecting the next packet that is transmitted on an output port 190, 195. Scheduler 211 and 212 pull packets from each queue 201a, 201b, 201c, 202a, 202b, and 202c based on their weights and send the traffic to the output ports 190, 195. Congestion occurs when packets arrive at an output port 190, 195 faster than they can be transmitted, hence need for queuing to tide over temporary congestion.

Incoming traffic is already classified into p different priority levels supporting possible traffic requirements. For example, where p=3 there may be: 1) high priority traffic that should not be dropped if possible, 2) low-latency traffic that should be de-queued first because it is time sensitive, and 3) best effort (or low priority) traffic that should be dropped first when buffer space becomes scarce. These priority levels are either indicated within the packets themselves, or can be derived from various other parameters derived from the packet or state maintained in the router 101. Those of ordinary skill in the art will understand there to be many possible bases for classification.

The arbiter 210 consistent with methods and systems in accordance with the present invention receives one packet per processor cycle from one of the input ports 170 and 180, including the information specifying the packet's priority level. The arbiter 210 places the packet into the queue corresponding to the priority level for the destination port. For example, where the packet was destined on output 190, the buffer manager 200 would place the packet in queue 201a if the priority level were "high priority," 201b if the priority level were "low latency," and 201c if the priority level were "best effort," in accordance with the exemplary priority levels listed above.

Figure 3:
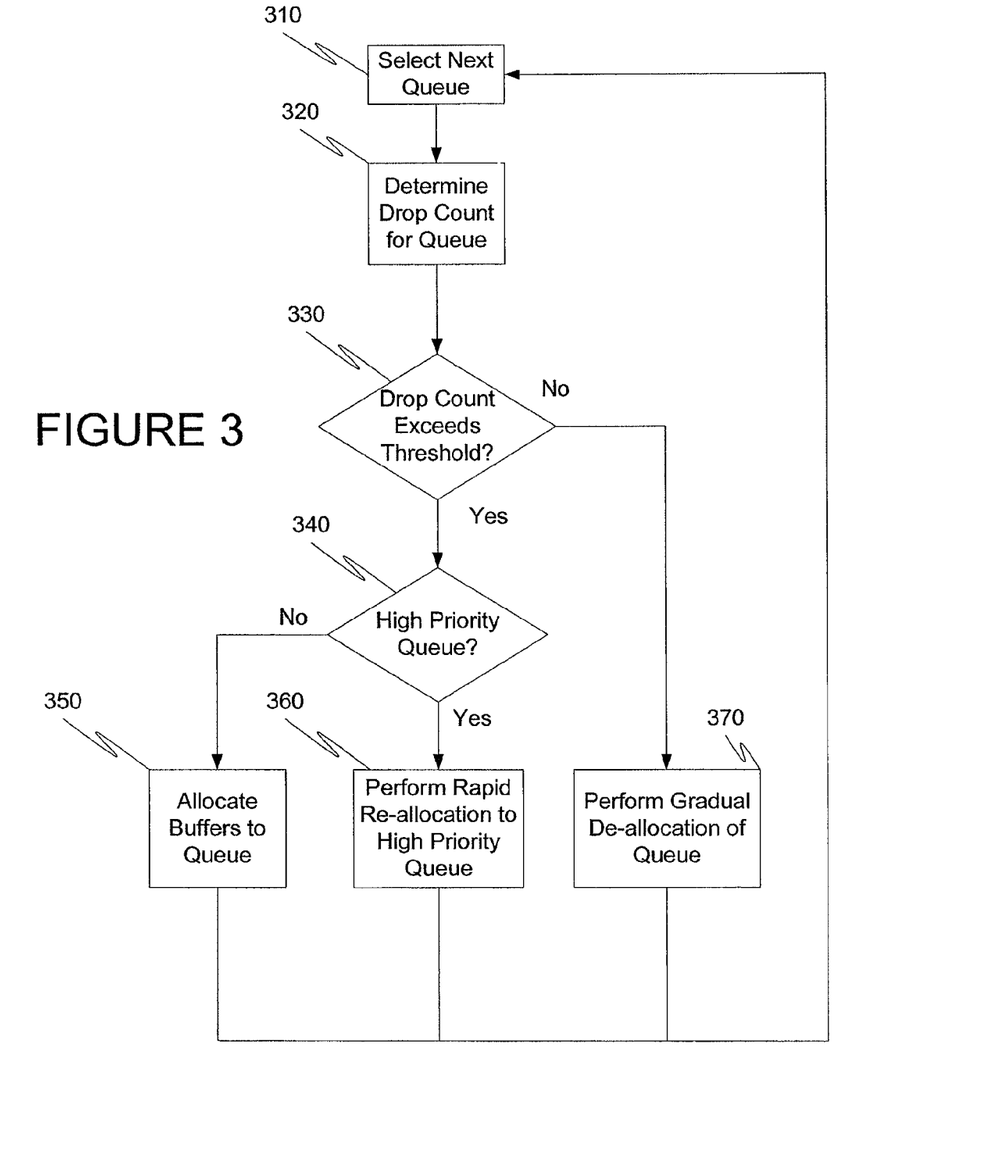
FIG. 3 illustrates a dynamic buffer management method consistent with methods and systems consistent with the present invention.

When traffic in a high priority queue such as queue 201a is low, it may be desirable to de-allocate buffers from the queue and reallocate them to lower priority queues that are experiencing heavy traffic. However, when a high priority queue does begin to experience heavy traffic, it is necessary to reallocate buffers to the high priority queue as quickly as possible. FIG. 3 illustrates a flow chart depicting a method buffer management with respect to queue priority levels consistent with methods and systems consistent with the present invention. The arbiter 210 starts and repeats an evaluation cycle, determining whether dynamic adjustment of buffer allocation is needed for each queue. The arbiter 210 first selects the next queue for evaluation, going in order of priority level (step 310). The arbiter 210 then determines the drop count for that queue, which is measured by the router 101 as the number of packets a queue has dropped in a given time interval (step 320). If the drop count is greater than a preconfigured threshold for that queue (step 330), and if the queue is a high priority queue (step 340), then the arbiter 210 performs a rapid relinquish (explained in detail below with reference to FIG. 4) that reallocates to the queue as many buffers as needed to reduce the drop count to zero or an acceptable level (step 350). Otherwise, if the queue is not a high priority queue (step 340), then the arbiter 210 allocates to the queue the lesser of what is needed by the queue according to the drop count, and the maximum that may be allocated to that queue (this may correspond to the priority level of that queue) (step 360). If the drop count is not greater than a preconfigured threshold for that queue (step 330), the arbiter 210 performs a gradual relinquish of buffers for that queue (explained in detail below with reference to FIG. 5) (step 370). The process is then repeated for the next queue (step 310).

Figure 4:
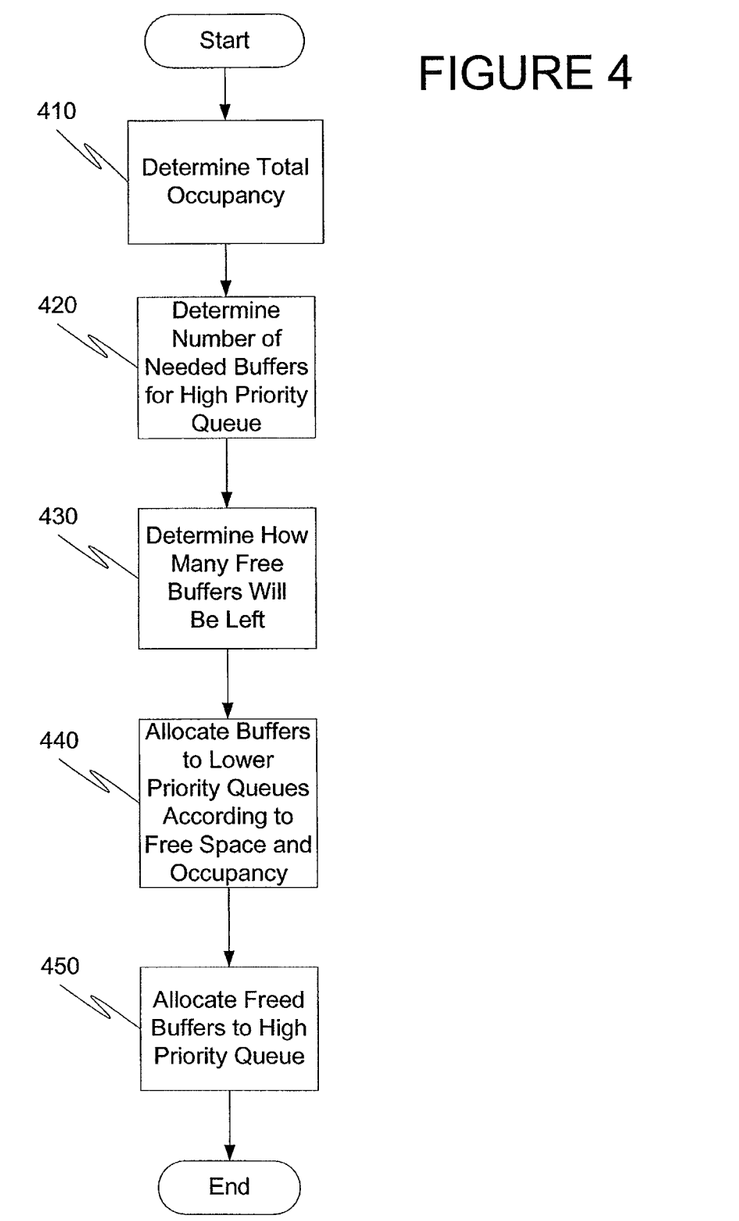
FIG. 4 illustrates a rapid buffer relinquish method consistent with methods and systems consistent with the present invention.

Rapid relinquish is explained with reference to FIG. 4. The arbiter 210 first determines the total occupancy of the buffer space, i.e., the number of buffers actually being used all the queues (step 410). The arbiter 210 then determines the number of needed buffers for the high priority queue, which is the current buffer allocation plus the drop count (step 420). The arbiter 210 then determines how much space in the buffer will be left over after all the needed buffers are allocated to the high priority queue (step 430). For each queue other than the high priority queue, the arbiter 210 determines a new allocation which is the current occupancy for that queue divided by the totally occupancy of the buffer space, multiplied by the free space left after the high priority queue receives its needed allocation (step 440). In this manner, each non-priority queue receives an allocation of the leftover buffer proportional to its previous occupancy. The freed buffers are allocated back to the high priority queue (step 450).

Figure 5:
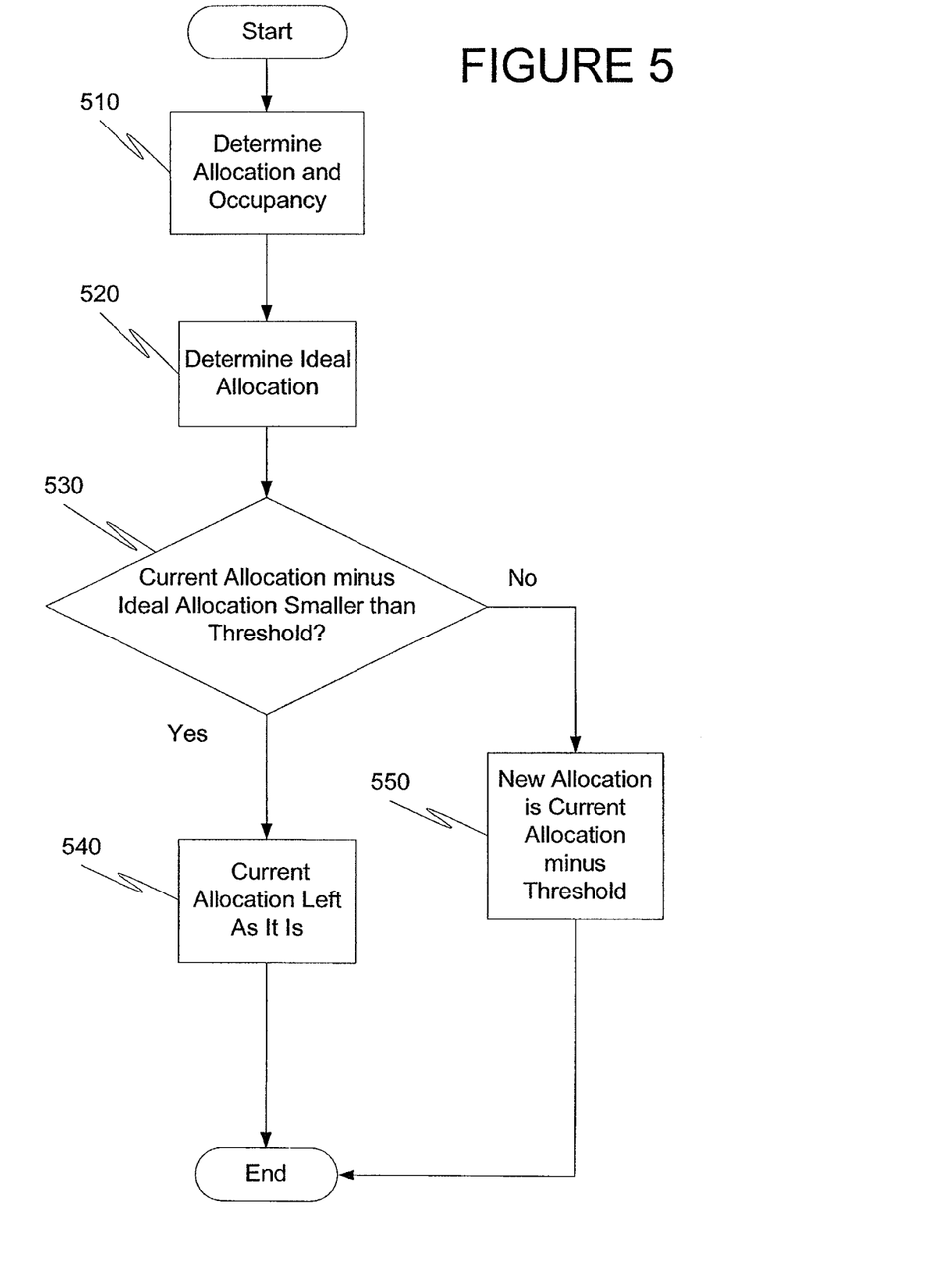
FIG. 5 illustrates a gradual buffer relinquish method consistent with methods and systems consistent with the present invention.

Gradual relinquish is explained with reference to FIG. 5. In a gradual relinquish, the arbiter 210 first determines the current allocation of the queue and the actual occupancy of the queue (i.e., how many of the buffers are being used) (step 510). The arbiter 210 then determines the ideal allocation for the queue, which is the greater of the occupancy and the minimum allowable allocation allowed for that queue (step 520). If the current allocation minus the ideal allocation is smaller than a threshold value (step 530), the current allocation remains unchanged (step 540). The threshold value is the minimum number of buffers that may be relinquished in this evaluation cycle. If the current allocation minus the ideal allocation is not smaller than a threshold value (step 530), then the new current allocation is the old current allocation minus the threshold value (step 550). In this process, buffers are released such that the queue controls how many are released at a given time.

Below is an exemplary pseudocode implementation of a method for managing buffer allocation consistent with methods and systems consistent with the invention. In this pseudocode implementation, there are three configured values: N is the maximum number of traffic classes; min_allocation[i] is the minimum number of buffers reserved for queue i, and quantum is the number of underutilized buffers that a high priority queue can relinquish per evaluation period. The pseudocode implementation also includes four temporary variables: curr_allocation[i] is the current buffer allocation for queue i, needed_bufs[i] is the number of buffers needed to prevent drops for queue i, drop_cnt[i] is the current drop count for the queue i, and occupancy[i] is the utilization of buffers for queue i. The implementation reads the drop count or the queue and calls a readjust function accordingly:

```
Method( )
{
    readjust_flag = 0;
    for ( I = N; i >=0; i--)
    {
        drop_cnt = read_drop_count(i);
        if (drop_cnt > config_drop_cnt[i])
        {
            re_adjust_buffer(i, UP, drop_cnt);
            readjust_flag = 1;
        }
    }
    if (readjust_flag = = 0)
    {
        re_adjust_buffer(N, DOWN, 0);
    }
}
/* This method is called if the buffer allocation needs to be re-adjusted */
re_adjust_buffer (q, direction, requirement)
{
    if (direction = = UP)
    {
        /* This queue needs more buffers. Increase the allocation */
        needed_bufs[q] = drop_cnt[q] + curr_allocation[q];
        curr_allocation[q] = MIN (max_allocation[q];
            (MAX(needed_bufs, min_allocation[q])));
        if (q>0)
        {
            re_adjust_buffer(q-1,DOWN_HIGH_DEPRIVED,
                needed_bufs[q]);
        }
    }
    else if (direction = = DOWN_HIGH_DEPRIVED)
    {
        /* At least one higher priority TC queue is deprived of buffers.
        Reduce my allocation fast */
        for (i = 0, total_occupancy=0; i < q; i ++)
        {
            total_occupancy += occupancy[i];
        }
        needed_bufs = requirement + (drop_cn[q] +
        curr_allocation[q]);
        for (i = 0, total_occupancy=0; i < q; i ++)
        {
            current.sub.-- allocation[i] =
                (total_capacity – needed_bufs) *
                    (occupancy[i] / total_occupancy);
        }
    }
    else if (direction = = DOWN)
    {
        /* Buffers allocated to this queue are underutilized. Gradually
        relinquish them */
        ideal_allocation_MAX(curr_allocation[q],
            (MAX(min_allocation[q],occupancy[q]));
        if ((curr_allocation[q] – ideal_allocation) > quantum[q])
        {
            curr_allocation[q]-= quantum[q];
        }
        else
        {
            curr_allocation[q] = ideal_allocation;
        }
    }
}
```

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

We claim:

1. A method comprising:
    selecting, for evaluation, a packet queue from a plurality of packet queues;
    determining a drop count associated with the selected packet queue;
    when the drop count is above a predetermined threshold for the selected packet queue and when the selected packet queue is a high priority queue:
    reallocating buffers to the selected packet queue by:
        (1) de-allocating unused buffers from at least two other packet queues from the plurality of packet queues to define a set of unused buffers,
        (2) allocating a first set of buffers from the set of unused buffers to the selected packet queue,
        (3) allocating a second set of buffers from the set of unused buffers not including the first set of buffers among lower priority queues from the plurality of packet queues, based at least on an occupancy of each lower priority queue from the plurality of packet queues;
    when the drop count for the selected packet queue is above the predetermined threshold and when the selected packet queue is not a high priority queue, re-allocating to the selected packet queue an amount of buffers, the amount of buffers being lesser of (1) a sum of the drop count and a current buffer allocation of the selected packet queue, and (2) a maximum allowable buffer allocation associated with a priority level of the selected packet queue;
    when the drop count for the selected packet queue is not above the predetermined threshold, de-allocating buffers from the selected packet queue in stages to achieve an allocation of buffers for the selected packet queue.

2. The method of claim 1, wherein allocating the first set of buffers from the set of unused buffers to the high priority queue includes determining a number of buffers for the first set of buffers by summing the drop count and a current buffer allocation of the high priority queue.

3. The method of claim 1, wherein allocating the second set of buffers from the set of unused buffers among lower priority queues includes (1) determining leftover buffers that are not included in the first set of buffers, and (2) allocating the leftover buffers among lower priority queues from the plurality of packet queues according to free space of each lower priority queue from the plurality of packet queues.

4. The method of claim 1, wherein allocating the second set of buffers from the set of unused buffers among lower priority queues includes allocating the second set of buffers among lower priority queues proportionally to current occupancy of the lower priority queues.

5. A non-transitory processor-readable medium storing code representing instructions to be executed by a processor, the code comprising code to cause the processor to:

select, for evaluation, a packet queue from a plurality of packet queues;
determine a drop count associated with the selected packet queue; and
when the drop count is above a predetermined threshold for the selected packet queue and when the selected packet queue is a high priority queue:
reallocate buffers to the selected packet queue by:
  (1) de-allocating unused buffers from at least two other packet queues from the plurality of packet queues to define a set of unused buffers,
  (2) allocating a first set of buffers from the set of unused buffers to the selected packet queue,
  (3) allocating a second set of buffers from the set of unused buffers not including the first set of buffers among lower priority queues from the plurality of packet queues, based at least on an occupancy of each lower priority queue from the plurality of packet queues;
when the drop count for the selected packet queue is above the predetermined threshold and when the selected packet queue is not a high priority queue, re-allocate to the selected packet queue an amount of buffers, the amount of buffers being lesser of (1) a sum of the drop count and a current buffer allocation of the selected packet queue, and (2) a maximum allowable buffer allocation associated with a priority level of the selected packet queue; and
when the drop count for the selected packet queue is not above the predetermined threshold, de-allocate buffers from the selected packet queue in stages to achieve an allocation of buffers for the selected packet queue.

6. The non-transitory processor-readable medium of claim 5, wherein the code to cause the processor to de-allocate buffers from the packet queue includes code to cause the processor to de-allocate buffers from the packet queue such that the packet queue has at least a predetermined minimum allocation of buffers.

7. An apparatus, comprising:
a memory including a plurality of buffers associated with a plurality of packet queues; and
a processor operatively coupled to the memory, the processor configured to:
select, for evaluation, a packet queue from the plurality of packet queues;
determine a drop count associated with the selected packet queue;
when the drop count is above a predetermined threshold for the selected packet queue at a first time and when the selected packet queue is a high priority queue, re-allocate buffers to the packet queue by:
  (1) de-allocating unused buffers from at least two other packet queues from the plurality of packet queues, to define a set of unused buffers,
  (2) allocating a first set of buffers from the set of unused buffers to the selected packet queue to lower the drop count at a second time after the first time, and
  (3) allocating a second set of buffers from the remaining buffers from the set of unused buffers not including the first set of buffers among lower priority queues from the plurality of packet queues based at least on an occupancy of each lower priority queue from the plurality of packet queues at a third time after the first time;
when the drop count for the selected packet queue is above the predetermined threshold and when the selected packet queue is not a high priority queue, re-allocate to the selected packet queue an amount of buffers, the amount of buffers being lesser of (1) a sum of the drop count and a current buffer allocation of the selected packet queue, and (2) a maximum allowable buffer allocation associated with a priority level of the selected packet queue;
when the drop count for the selected packet queue is not above the predetermined threshold, de-allocate buffers from the selected packet queue in stages to achieve an allocation of buffers for the selected packet queue.

8. The apparatus of claim 7, wherein the processor is configured to determine leftover buffers that are not included in the first set of buffers, and allocate the leftover buffers among lower priority queues from the plurality of packet queues according to free space of each lower priority queue from the plurality of packet queues.

9. The apparatus of claim 7, wherein the processor is configured to allocate the second set of buffers among lower priority queues proportionally to current occupancy of the lower priority queues.

10. The apparatus of claim 7, wherein the processor is configured to de-allocate buffers from the lower priority queues from the plurality of packet queues, and allocate the de-allocated buffers to the packet queue.

* * * * *